United States Patent [19]

Lalin et al.

[11] 4,082,171

[45] Apr. 4, 1978

[54] ROTARY PLATE CARRIER DRUM FOR MULTI-PLATE CLUTCHES OR BRAKES

[75] Inventors: André Lalin; Roger Brisabois, both of Boulogne-Billancourt, France

[73] Assignee: Regie Nationale des Usines Renault, Boulogne-Billancourt, France

[21] Appl. No.: 725,232

[22] Filed: Sep. 21, 1976

[30] Foreign Application Priority Data

Sep. 25, 1975 France ............................. 75 29352

[51] Int. Cl.² ............................................ F16D 13/52
[52] U.S. Cl. .................................. 192/70.2; 188/71.5; 192/87.11
[58] Field of Search ................ 192/70.2, 87.11, 87.15; 188/18 A, 71.1, 71.5

[56] References Cited

U.S. PATENT DOCUMENTS

| 3,747,727 | 7/1973 | Dach et al. ............... 192/70.2 X |
| 3,915,272 | 10/1975 | Maurice ...................... 192/70.2 |

*Primary Examiner*—Allan D. Herrmann
*Attorney, Agent, or Firm*—Fleit & Jacobson

[57] ABSTRACT

Rotary plate-carrier drum for multi-plate clutches or brakes comprising a bearing plate adapted to encompass a set of keys formed on the outer cylindrical periphery of the drum, the keys being separated by longitudinal slots engaged by the radial extensions of the internal plates and external plates, respectively, of a pair of coaxial clutches. This drum construction is intended more particularly for multi-plate clutches of planetary change-speed transmission mechanisms.

2 Claims, 4 Drawing Figures

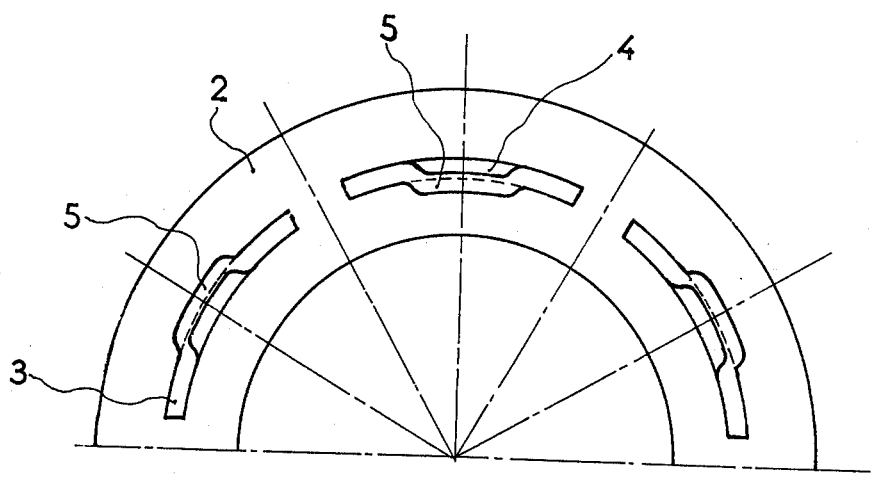
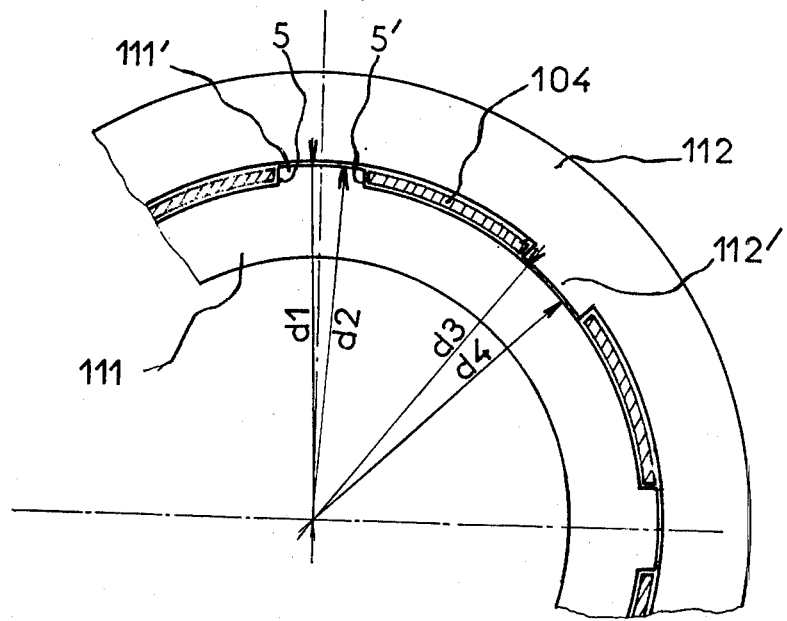

ROTARY PLATE CARRIER DRUM FOR MULTI-PLATE CLUTCHES OR BRAKES

The present invention relates in general to multi-plate clutches and brakes, and has specific reference to improvements in or relating to the drums supporting the sheet-metal plates thereof.

As a rule, the mechanism of a change-speed transmission comprises stacked friction plates or disks constituting clutches or brakes. The function of these clutches or brakes is to couple for synchronous rotation the input shaft of the mechanism, notably in the case of a planetary change-speed mechanism, with the components of the planetary train such as sun gears, annuli, planet carriers. Thus, the friction plates or disks are rotatably rigid with a plate carrier drum permitting however the axial movements of the plates, this axial movement being limited by an abutment member adapted to withstand the axial effort necessary for clamping the plates.

A typical embodiment of this plate carrier drum consists of a notched sheet metal member obtained by properly shaping a cylindrical drum blank. The axial abutment member for the plates consist in this case of a resilient stop ring fitted in a groove machined inside the drum.

However, this construction is attended by various difficulties.

More particularly, machining grooves by removing metal in notched or castellated drums constitutes a difficult operation for the cutting tools are exposed to severe shocks as they move from one notch to another. Besides, the removal of the many burrs caused by this machining operation also constitutes a tedious task for these burrs are located on the side and bottom of each notch. Therefore, this operation is both time-robbing and expensive, and cannot be performed at a high production rate.

On the other hand, resilient stop rings do not provide in all cases a very reliable solution for the abutment member, since they are liable to become loose as a consequence of the repeated thrust efforts applied thereto. To reduce this possibility, the grooves must be machined with a relatively high degree of precision in the direction at right angles to the side faces of the grooves in relation to the drum axis.

To solve these various problems, a known proposition consisted in using a drum of plain sheet metal having substantially rectangular grooves splines formed in its surface, in the axial direction, these grooves receiving radial extensions formed at the outer periphery of each friction plate. In this case, the axial bearing surfaces of the plates are obtained by locally altering the drum configuration.

It is the primary object of this invention to provide an improved plate carrier drum of the type set forth hereinabove with a view to facilitate the assembling of the external and internal plates without modifying its dimensional properties and without resorting to a preliminary change of shape of the drum proper.

According to this invention, at least two slots or notches extend on either side of a key engaging an elongated aperture formed in the friction-plate axial driving member or pressure plate, the shape of the outer end of this key being modified locally to constitute the abutment member of said driving member or peressure plate.

In a drum thus constructed, the friction-plate axial driving member is adapted to hold in position the external and internal friction plates of the drum and to prevent the radial distortion of the drum surface under the influence of the centrifugal force at high speed. For this purpose, the driving plate also acts as a binding member affording a substantial simplification in the drum manufacture due to the set of longitudinal slots opening on one of the drum faces. When the carrier drum comprises internal and external friction plates, the arrangement may advantageously comprise alternate radial extensions of the external and internal friction plates, respectively.

Other features and advantages of this invention will appear as the following description proceeds with reference to the attached drawings, in which:

FIG. 3 is a fragmentary front view of the abutment plate assembled with the drum, and FIG. 4 illustrates the relative arrangement of the internal and external friction plates in relation to the drum.

Figure 1:
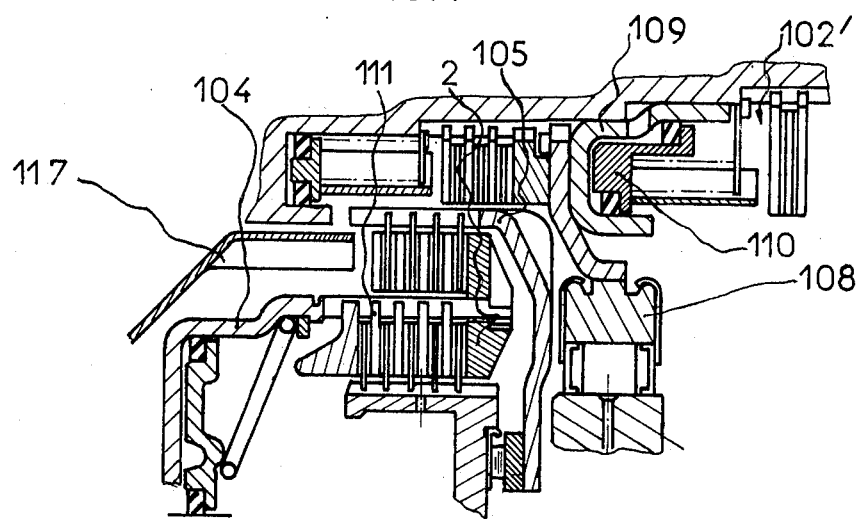
FIG. 1 is an axial section showing one portion of the mechanism of a change-speed transmission.
Figure 1:
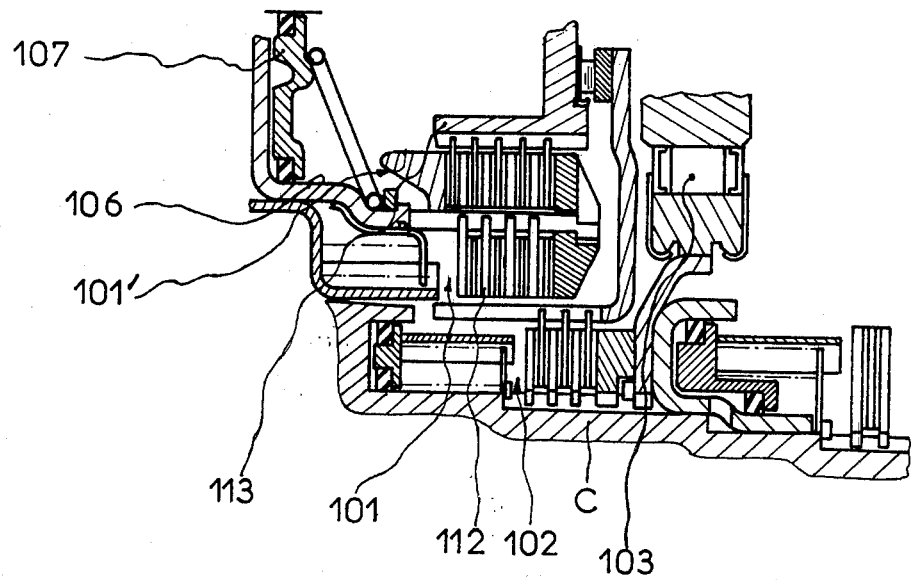

The mechanism illustrated in FIG. 1, as well known in the art, comprises clutch devices 101, 101', braking devices such as 102, 102' and a freewheel 103 for obtaining three forward transmission ratios and one reverse transmission ratio at the output shaft (not shown) of the mechanism.

The clutches 101, 101' and brake 102 are disposed concentrically in the left-hand portion of the mechanism, as shown in the Figure, and the planetary gear mechanism (not shown) is assumed to lie in the right-hand portion.

The sheet-metal clutch drum 104 opens towards the clutch bell 105 and comprises a cylindrical internal bearing surface 106 constituting a cylinder slidably engaged by the associated control piston 107.

The external fixed ring 108 of freewheel 103 is rigid with the cylinder 109 slidably engaged by the piston 110 controlling the brake 102'.

The sheet-metal drum 104 carries a set of internal friction plates 111 and another set of external friction plates 112, these sets of plates being disposed internally of the drum peripheral portion, respectively.

Figure 2:
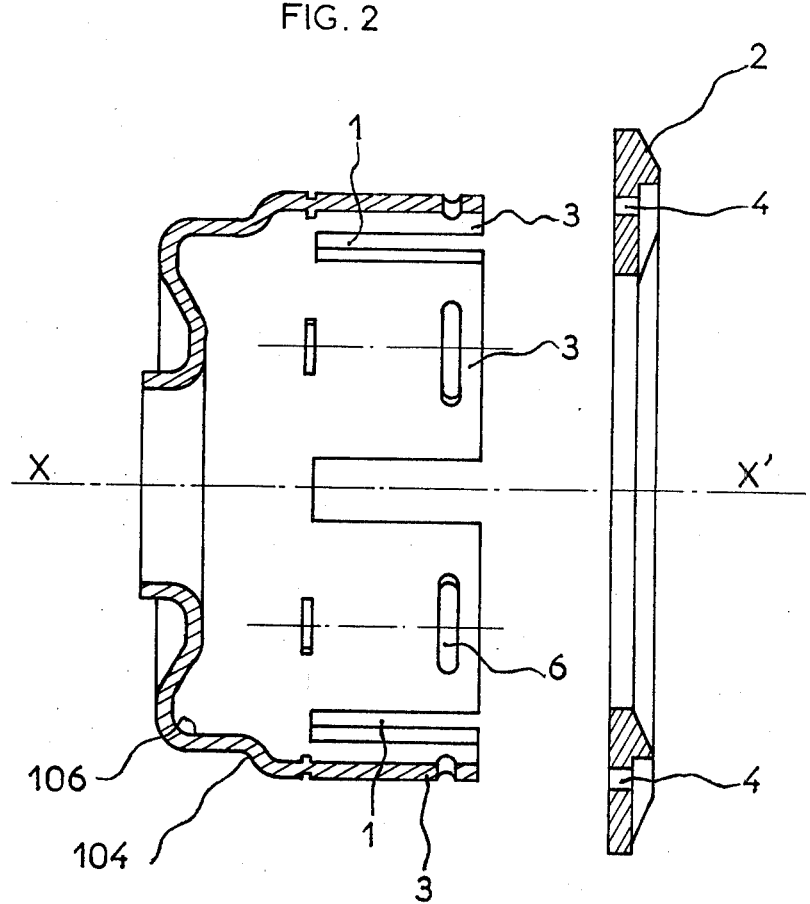
FIG. 2 is an axial section showing the friction plate carrier drum and the driving plate associated therewith.

Referring to FIG. 2, it will be seen that this peripheral portion of drum 104 has longitudinal slots 1 or notches formed therein in the longitudinal direction, i.e. parallel to its axis of rotation X–X', an abutment member or bearing plate 2 being provided for retaining the plates 111 and 112 when these plates are pushed by the corresponding control pistons 107 and 117, respectively towards said abutment member or bearing plate 2.

According to a specific feature characterising this invention, at least two of said longitudinal slots 1 extend on either side of a key 3 engaging an elongated aperture 4 formed in said abutment member or bearing plate 2.

As illustrated in FIG. 3, the shape of the outer end of each key 3 is altered locally at 5, after the assembling operation, in order to fix the longitudinal or axial position of said abutment member or bearing plate 2. The latter constitutes the common bearing plate of the two sets of clutch plates 101' and 101, and extends both internally and externally of the outer peripheral cylindrical portion of the drum 104.

To facilitate this local distortion of keys 3, holes 6 are formed therethrough.

Referring to FIG. 4, it will be seen that the drum 104 carries the two sets of plates 111, 112 disposed internally and externally of the drum, respectively, and that these plates 111, 112 comprise radial extensions 111', 112' engaging the drum slots 1. Thus, an imbrication of plates 111, 112 is obtained wherein the outer diameter $d4$ of the internal plates 111 is substantially equal to the diameter $d3$ of the circle containing the inner edges of the radial inner extensions 112' of the external plates 112, and the inner diameter $d1$ of these external plates is substantially equal to the diameter $d2$ of the circle containing the outer edges of the radial outer extensions 111' of the internal plates 111.

The component elements of the drum structure 104 are assembled as follows:

Firstly, the internal lined and plain plates are mounted in alternation with the external lined and plain plates, of course with the internal lined plates and the external lined plates attached the former to the hub 113 and the latter to the clutch bell 105.

Then the abutment member or bearing plate 2 is placed on the drum 104 and locked in position by altering the shape of the outer ends of the keys 3, as illustrated in FIG. 3.

The assembled drum 104 is positioned in the casing of the mechanism according to the conventional method with due consideration for the necessary order in which the various component elements of this mechanism are assemblied. Thus, for instance, in the case illustrated in FIG. 1, the hub 113 and bell 105 are mounted in this order in the casing C after the drum 104.

From the foregoing it is clear that the abutment member or bearing plate 2 binds the outer cylindrical portion of the drum 104 and positively prevents the radial distortion of the keys 3 under the influence of the centrifugal force developed during the drum rotation at high speed. The assembly comprising essentially the drum 104 and its abutment member or bearing plate 2 will consequently have the same strength as a drum having a continuous surface while being considerably lighter in weight and facilitating the assembling of the various friction plates. The assembly thus obtained is particularly sturdy and can be stored as such in view of its subsequent mounting in the transmission mechanism in the process of manufacturing the change-speed transmission.

What is claimed as new is:

1. Rotary plate-carrier drum, notably for multi-plate clutches and brakes, which comprises at least two longitudinal slots extending on either side of a key engaging an elongated hole formed in an axial abutment member for the friction plates associated with said drum, the outer end of said key being shaped to act as a stop to said abutment member, said abutment member constituting the friction-plate bearing plate of a pair of clutches and extending both inwards and outwards of the outer peripheral cylindrical portion of said drum.

2. Rotary plate-carrier drum as set forth in claim 1, comprising an internal set and an external set of friction plates which are provided with radial extensions engaging the drum slots, the outer diameter of the internal plates of said drum being substantially equal to the diameter of the circle containing the inner edges of the radial extensions of said external plates, while the inner diameter of the external plates is substantially equal to the diameter of the circle containing the outer edges of the radial extensions of said internal plates.

* * * * *